United States Patent [19]

Otsuka

[11] Patent Number: 5,058,142
[45] Date of Patent: Oct. 15, 1991

[54] CLOCK EXTRACTING CIRCUIT IN DIGITAL-LINE SIGNAL RECEIVER

[75] Inventor: Eiji Otsuka, Hino, Japan

[73] Assignee: Kabushiki Kaisha Toshiba, Kawasaki, Japan

[21] Appl. No.: 501,925

[22] Filed: Mar. 30, 1990

[30] Foreign Application Priority Data

Mar. 31, 1989 [JP] Japan .................................... 1-82779

[51] Int. Cl.$^5$ .............................................. H04L 7/00
[52] U.S. Cl. .................................... 375/118; 307/510
[58] Field of Search ............... 375/118, 110, 119, 106, 375/4; 328/109, 110, 137, 139, 63; 307/510, 511

[56] References Cited

U.S. PATENT DOCUMENTS

4,573,173  2/1986  Yoshida ................................ 375/118
4,821,297  4/1989  Bergmann et al. .................. 375/106

*Primary Examiner*—Stephen Chin
*Attorney, Agent, or Firm*—Finnegan, Henderson, Farabow, Garrett, and Dunner

[57] ABSTRACT

A clock extractor which generates a clock signal for sampling of a data of a data signal received from a digital line on the basis of a separation clock having a period corresponding to a data communication rate of a data to be separated from the received data signal. The clock extractor always generates a plurality of clock signals which have respectively an identical period corresponding to a data communication rate of the received data signal and which phases are slightly shifted mutually, and each time selects one of the plurality of clock signals as a clock signal for sampling of the received data signal. In the selecting operation of the clock extractor, a change in the logical level of the separation clock to a specific level is detected with resolution power corresponding to the slightly mutually shifted phases of the plurality of clock signals, and any one of the plurality of clock signals is specified according to the detection timing. The clock signal thus specified can be used to most faithfully reproduce the phase of the separation clock and the continuity of the separation clock as a clock signal.

10 Claims, 8 Drawing Sheets

CLOCK EXTRACTING CIRCUIT IN DIGITAL-LINE SIGNAL RECEIVER

BACKGROUND OF THE INVENTION

1. Field of the Invention

The present invention relates to a clock extracting circuit in a digital-line signal receiver which is used in an electronic exchange connected to an integrated services digital network (ISDN) or the like digital line network to extract a clock signal from the data of a signal received from the digital line network, the clock signal being used to sample the data of the signal therefrom and more particularly, to a circuit which can realize extraction of a clock signal with a small-scaled circuit configuration and with stability and accuracy at all times.

2. Description of the Related Art

In an electronic exchange having a slave synchronization type of interface such as a first-order group interface in the ISDN, the sampling of a data signal received from the ISDN requires the extraction of a clock signal having a period corresponding to a data communication rate from the data signal. Such a first-order interface is provided for each of the trunk circuits within a private branch exchange.

Figure 1:
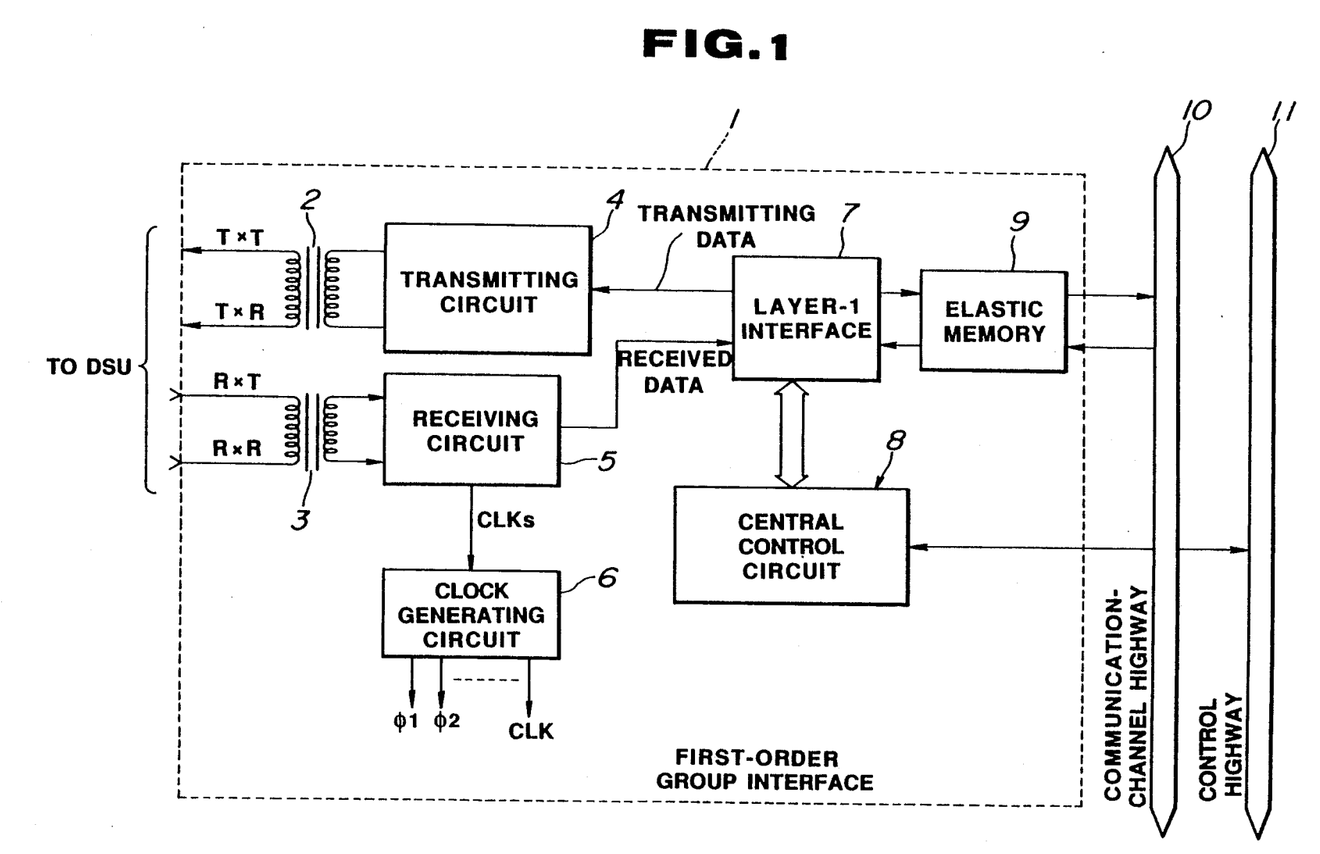
FIG. 1 is a block diagram showing an internal arrangement of a first-order group interface of an ISDN.

An internal configuration of such a first-order group interface 1 in the ISDN is exemplified in FIG. 1. The first-order group interface is connected through a network terminating unit (DSU, not shown) to an ISDN line.

As shown in FIG. 1, the first-order group interface 1 includes signal transmitting and receiving transformers 2 and 3 connected to the DSU, a signal transmitting circuit 4 for transmitting a transmission data, a signal receiving circuit 5 for receiving data from the ISDN and extracting from the received data a clock signal CLKs for sampling of the received data, a clock generating circuit 6 for generating various clock signals Φ1, Φ2, ... to be controllably used to absorb a phase difference or jitter between a speech-channel highway 10 in the exchange and the DSU on the basis of the extracted clock signal CLKs and also for generating a clock signal CLK to be used for a time-divisional switch, "layer 1" interface 7 for transfer of data or control information between the speech-channel highway 10 and a control highway 11 within the exchange, a central control circuit 8 for receiving from the interface 7 data on a D channel in the channel structure of "23B+D" or "30B+D" and for performing protocol control of higher layers than the "layer 1" to perform transfer of the control data between the control highway 11 and the control circuit 8, and an elastic memory 9 for absorbing the phase difference or jitter occurred when transmitting data between the speech-channel highway 10 and the DSU.

Explanation will next be briefly made by also referring to FIG. 2 as to the operation of the signal receiving circuit 5 which mainly extracts the clock signal on the basis of the data of the signal received at the first-order group interface 1 for the purpose of sampling the data of the received signal.

Figures 2A, 2B:
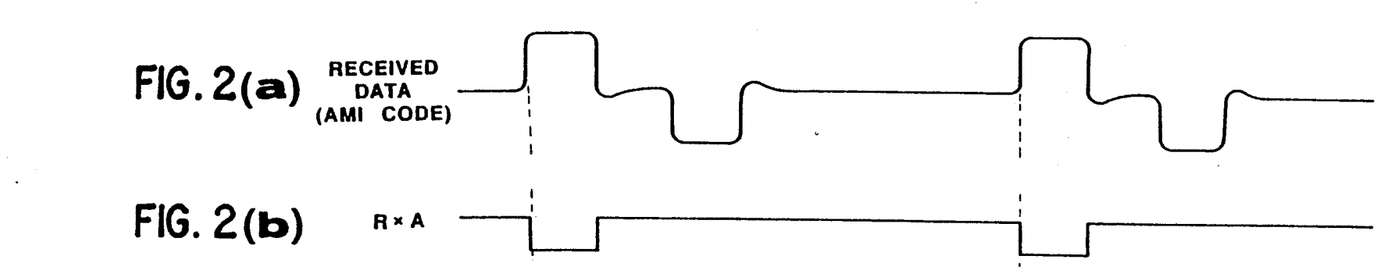
Figure 2C:
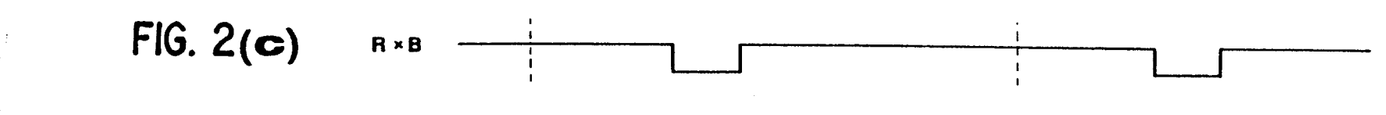
Figure 2D:
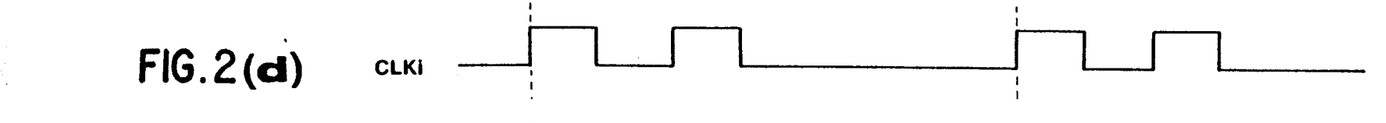
Figure 2E:
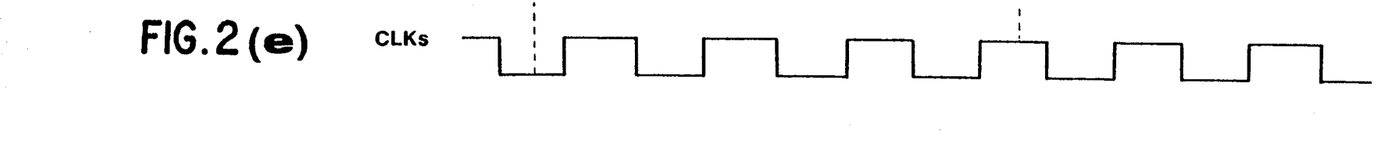

A data to be transmitted from terminals TxT and TxR of the transmitting transformer 2 and a data to be received at terminals RxT and RxR of the receiving transformer 3 are respectively made usually in the form of such an alternate mark inversion (AMI) code having logical levels "0" and "1" as expressed in, e.g., FIG. 2(a).

The signal receiving circuit 5, when receiving a data of such AMI code configuration through the receiving transformer 3, generates signals RxA and RxB in which logical level "0" zones correspond to zones defined by polarity changes in the level of the received data signal as shown in FIG. 2(b) and (c), and further generates such a signal CLKi as shown in FIG. 2(d) corresponding to a logical sum of these generated signals RxA and RxB (more precisely, by logically inverting them, that is, corresponding to a NAND condition). The data level of the signal CLKi is not varied in logical level "0" zones. For the purpose of alternately changing the logical level of the signal CLKi at a predetermined period even in the logical level "0" zones, a signal having a predetermined period corresponding to the alternate period of the signal CLKi is separately generated, that is, such a signal CLKs as shown in FIG. 2(e) is eventually generated at the signal receiving circuit 5. The signal CLKs thus generated is outputted from the circuit 5 to the clock generating circuit 6 as a clock signal extracted from the received data signal.

In this way, the signal receiving circuit 5, even there is a level non-change region in the received data signal of the AMI code configuration, acts to acquire the clock signal CLKs as its extraction clock which alternates always at the predetermined period corresponding to the communication rate of the data.

Figure 3:
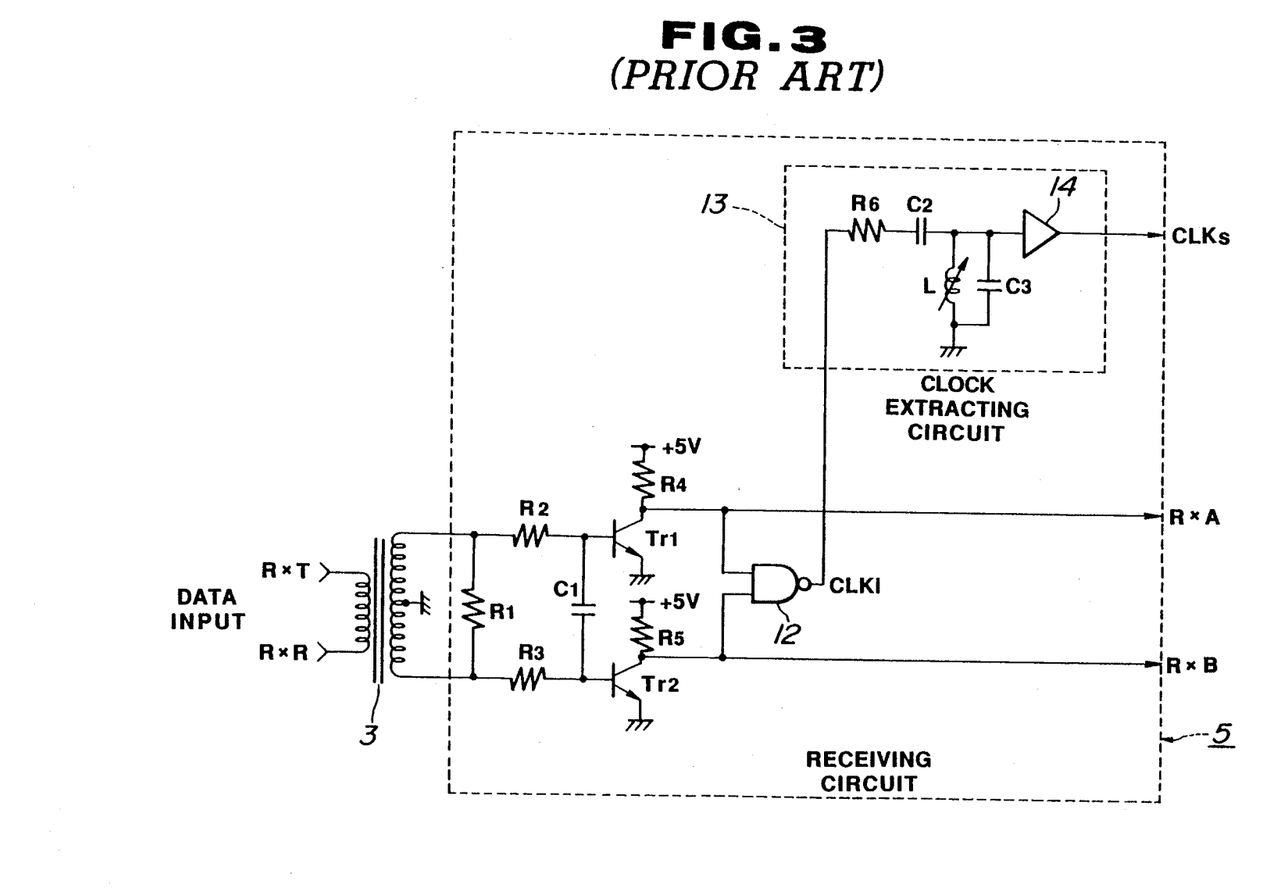
FIG. 3 is a circuit diagram of a prior art signal-receiving circuit in the first-order group interface, including a clock extracting circuit.

FIG. 3 is an example of the configuration of the prior art signal receiving circuit 5 so far widely used, which includes a clock extracting circuit for extracting or generating the clock signal CLKs on the basis of the aforementioned logical sum signal (corresponding to a clock component separation signal from the received data signal, which will be referred to as the separation clock or separation clock signal, hereinafter).

The signal receiving circuit 5 will be sequentially detailed in the following.

As shown in FIG. 3, the receiving transformer 3, which is connected to the input terminals of the signal receiver 5, is grounded at the middle point of its secondary winding.

In the signal receiver 5, a resistor R1 is connected in parallel to the secondary winding of the transformer 3 at its output terminals. Further connected to the output terminals of the transformer 3 are transistors Tr1 and Tr2 at their base electrodes through series resistors R2 and R3 respectively. The base electrodes of the transistors Tr1 and Tr2 are commonly connected to each other by means of a capacitor C1 and the emitter electrodes thereof are respectively grounded. The transistors Tr1 and Tr2 are connected at their collector electrodes with collector resistors R4 and R5 respectively and also connected thereat to a NAND gate 12. The NAND gate 12 itself is connected at its output to a clock extracting circuit 13.

The clock extractor 13, as shown in FIG. 3, comprises a resistor R6 and a capacitor C2 which form a differentiating circuit, a variable inductance L and a capacitor C3 which form a parallel resonance circuit, and a high-gain amplifier 14.

With such an arrangement as mentioned above, when the receiving transformer 3 receives such a data signal as shown in FIG. 2(a) at the input terminals RxT and RxR of its primary winding, either one of the transistors Tr1 and Tr2 is conducted in the level change regions of the received data signal so that the transistors Tr1 and Tr2 output at their collectors such signals RxA and RxB as shown in FIG. 2(b) and (c). When these signals RxA and RxB are applied to the NAND gate 12, the gate outputs the NAND signal as shown in FIG. 2(d), that is, the separation clock CLKi.

In the clock extractor 13, the differentiating circuit of the resistor R6 and capacitor C2, when receiving the separation clock CLKi from the NAND gate 12, generates a differentiation signal on the basis of the received separation clock CLKi at rising and falling timing. The generated differentiation signal is further applied to the parallel resonance circuit of the inductance L and capacitor C3 to cause a parallel resonance to induce a resonance output that in turn is then sent to the high-grain amplifier 14 to obtain such a clock signal CLKs as shown in FIG. 2(e). The clock signal thus obtained is outputted from the clock extractor 13 to the clock generator 6 as a clock extracted from the received data signal.

The "layer 1" interface 7 in FIG. 1, on the other hand, separates a synchronization bit from the received data signal in synchronism with the clock signal CLKs thus extracted, transfers B-channel data bits following the separated synchronization bit to the speech-channel highway 10 through the elastic memory 9 and also transfers D-channel data bits to the central control circuit 8.

The elastic memory 9 functions to adjust the output timing of the B-channel data bits with use of the clock signals $\Phi 1$, $\Phi 2$, ... generated at the clock generator 6 so that a phase difference or jitter between the speech-channel highway 10 and the memory 9 is within its allowable range, and to transfer the adjusted data bits to the speech-channel highway 10. The B-channel data bits thus transferred to the speech-channel highway 10 are supplied to the time divisional switch (not shown) where the data bits are subjected to a time-divisional switching operation in synchronism with the clock signal CLK generated at the clock generator 6.

The central control circuit 8, when receiving the D-channel data bits from the interface 7, performs protocol control of higher than "layer 2" designated by the D-channel data bits to transmit and receive control data to and from the control highway 11.

The clock extractor 13 in FIG. 3, is advantageous in that the clock extractor can be made relatively simple in circuit configuration because of the use of the LC resonance circuit, but is disadvantageous, as a clock extractor to be used in such a digital line signal receiving circuit, in the following respects:

(a) When a region in the aforementioned separation clock CLKi which does not vary in logical level lasts long, the LC resonance voltage attenuates and thus it becomes difficult to obtain the desired clock signal CLKs.

(b) When a trouble takes place in lines and so on, it is impossible to obtain the separation clock CLKi itself and thus it is also impossible for the clock extractor 13 to output the clock signal CLKs. That is, when such a trouble occurs, it is necessary to transmit the trouble state to the communication party but such transmission becomes impossible due to such reasons.

(c) Because the clock extractor is used at high frequencies, it is indispensable to finely adjust the time constant of the L and C elements and correspondingly, these L and C elements must be very high in accuracy.

(d) For the same reason as the above (because of the use of the clock extractor at high frequencies), it is difficult to manufacture a pulse coil. It is also difficult to make and mount the clock extractor in the form of an integrated circuit (IC).

For such reasons, there has been recently employed as the above clock extractor a phase locked loop (PLL) circuit which, even when a trouble occurs in signal reception, can continuously supply the normal clock signal to the clock generator 6 and which also can easily realize non-adjustment.

Such a PLL circuit, however, has an output frequency of, for example, 1.544 MHz or 2.045 MHz for the first-order group interface. Accordingly, it is impossible to directly use the output of the PLL circuit as it is as the clock signal of the time-divisional switch in an exchange handling data having a transmission rate (communication rate) of 1.536 Kbps (64 Kbps per channel, and corresponding to 24 channels). For this reason, an additional PLL circuit for adjustment of divided frequency value is needed which usually results in a large-scaled circuit.

In addition, the use of such a PLL circuit requires a fairly complicated circuit for phase comparison of a discontinuous clock separated from the received data signal.

SUMMARY OF THE INVENTION

In view of the such circumstances, it is an object of the present invention to provide a clock extractor in a digital line signal receiving circuit, which can extract a clock signal always stably and accurately with use of a simple and small-scaled circuit configuration while completely eliminating the need for troublesome circuit adjustment and the like.

In order to attain the above object, a clock extractor in accordance with the present invention always generates a plurality of clock signals which have respectively an identical period corresponding to a data communication rate of a data signal received from a digital line and which phases are slightly shifted mutually, and every time selects one of the plurality of clock signals as a clock signal for sampling of the data of the received data signal, on the basis of a separation clock which is separated from the received data signal and which has a period corresponding to the data communication rate of the received data signal. In the selecting operation of the clock extractor, a change in the logical level of the separation clock to a specific level is detected with resolution power corresponding to the slightly mutually shifted phases of the plurality of clock signals, and any one of the plurality of clock signals is specified according to the detection timing.

The clock signal thus specified can be used to most faithfully reproduce the phase of the separation clock and the continuity of the same separation clock as a clock signal for sampling of the received data signal through full non-adjustment. With such an arrangement, the clock extractor can eliminate the need for the use of a PLL circuit or the like and can realize a small-scaled configuration suitable for making it in the form of an integrated circuit.

BRIEF DESCRIPTION OF THE DRAWINGS

FIG. 2A–2E is a timing chart for explaining a relationship between a data signal received at the first-order group interface and a clock signal extracted therefrom;

DESCRIPTION OF THE PREFERRED EMBODIMENTS

Figure 4:
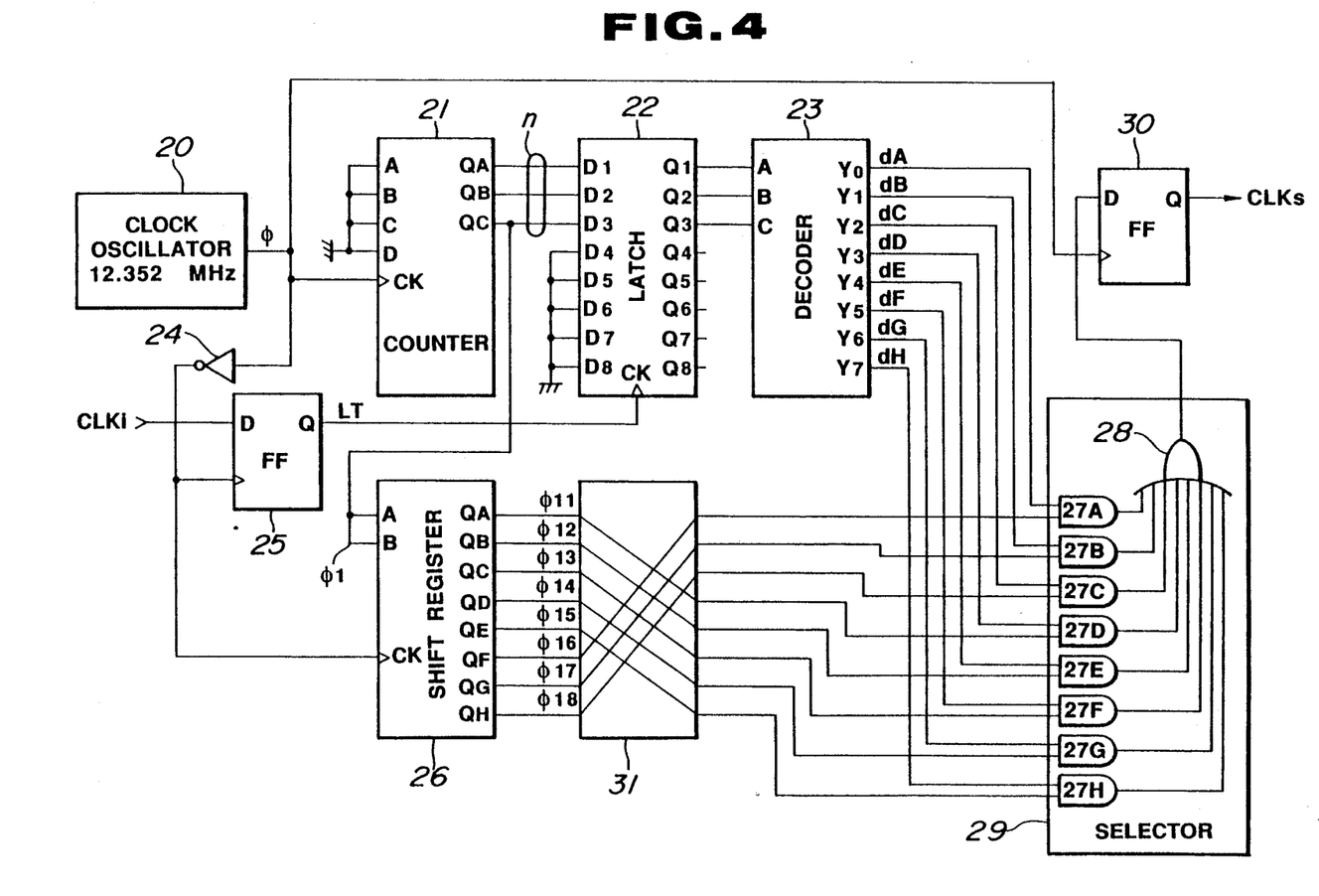
FIG. 4 is a block diagram showing the arrangement of an clock extracting circuit in accordance with an embodiment of the present invention.

Referring to FIG. 4, there is shown a clock extracting circuit in accordance with an embodiment of the present invention. Even in the present embodiment, the clock extractor is intended to be used in such a signal receiving circuit of the first-order group interface as shown in FIG. 3. The clock extractor of FIG. 4 includes a clock oscillator 20 for generating as an original clock signal $\Phi$ a clock signal of a frequency 12.352 MHz corresponding to 8 times a data transmission rate (of 1.544 Mbps) of ISDN line, a counter 21 for dividing the frequency of the original clock signal $\Phi$ generated at the clock oscillator 20 into $\frac{1}{8}$ to obtain a clock signal $\Phi1$ having a frequency of 1.544 MHz and for outputting the clock signal $\Phi1$ from its output terminal Qc ($2^3$ in weight), a latch circuit 22 for latching the count value (counter value) n of the counter 21, a decoder 23 for decoding the count value n (binary data) of 3 bits latched at the latch circuit 22, an inverter 24 for inverting the original clock signal $\Phi$, a flip-flop 25 for receiving the separation clock signal CLKi issued from the NAND gate 12 (refer to FIG. 3) on the basis of the inverted original clock signal received from the inverter 24 and for outputting a set output signal to the latch circuit 22 as a latch timing signal LT for the latch 22, a shift register 26 for delaying the clock signal $\Phi1$ of 1.544 MHz (corresponding to the $\frac{1}{8}$ divided frequency signal having a frequency that is $\frac{1}{8}$ of the frequency of the original clock signal $\Phi$) issued from the counter 21 sequentially at the period of the original clock signal $\Phi$ to generate 8 sorts of delay clock signals $\Phi11$ to $\Phi18$ which are shifted with respect to phase sequentially by one period of the original clock signal $\Phi$, a selector 29 comprising 8 AND gates 27A to 27H and an OR gate 28 for selectively outputting through the OR gate 28 one of the 8 sorts of delay clock signals $\Phi11$ to $\Phi18$ corresponding to ones of the AND gates which are opened on the basis of outputs dA to dH (only one of which is made to be "1" and rest are made to be "0" by the latch 22) of the decoder 23, a D type flip-flop 30 for receiving the delay clock signal $\Phi1i$ ($i=1, 2, \ldots$, or 8) from the OR gate 28 at the period of the clock signal $\Phi$ of 12.352 MHz and for outputting the received delay clock signal as the extraction clock signal CLKs for sampling of the received data signal, and a cross circuit 31 for intentionally crossing output lines corresponding to the 8 sorts of delay clock signal $\Phi11$ to $\Phi18$ as illustrated to decide the phase of the extraction clock signal CLKs as the output of the D type flip-flop 30 on the basis of correlations between the delay clock signals $\Phi11$ to $\Phi18$ and the decoder outputs dA to dH preferably or more concretely in such a manner as convenient in receiving the data signal. The clock oscillator 20 may be used also as a clock source for determining the frequency of the associated central office. In this case, the clock oscillator 20 may be commonly used for the respective trunk circuits within the private branch exchange. It will be appreciated from the foregoing explanation that such clock extracting circuit and thus the first-order group interface including the clock extractor is provided for each of the trunk circuits within the private branch exchange.

Figure 5:
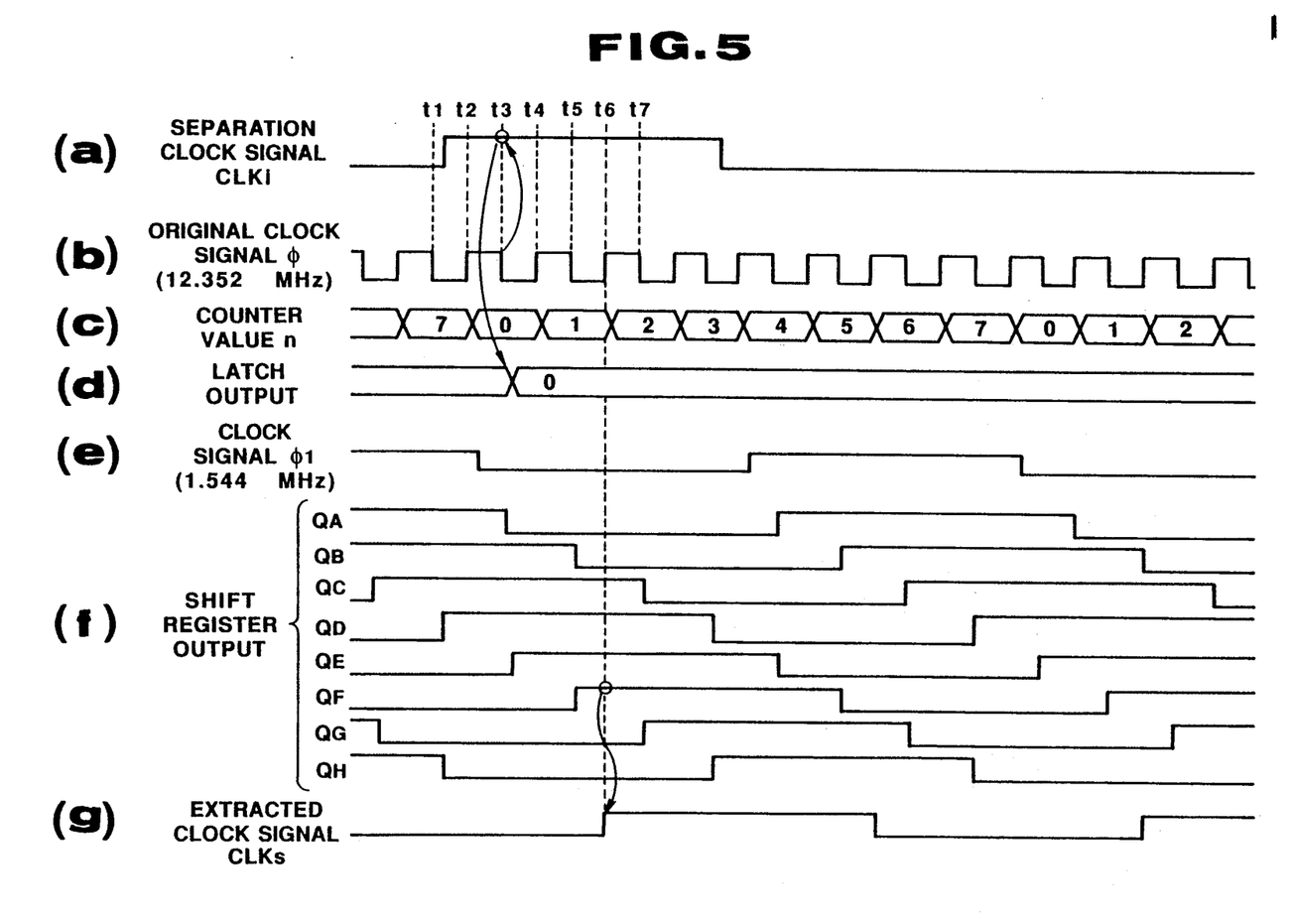
FIG. 5 is a timing chart for explaining an exemplary operation of the clock extractor of the embodiment of FIG. 4.

The operation of the clock extractor of the embodiment illustrated in FIG. 4 will next be detailed by also referring to FIG. 5.

In the clock extractor having such an arrangement as mentioned above, the counter 21 counts 3 bits on the basis of the original clock signal $\Phi$ of 12.352 MHz received from the clock oscillator 20 to output the count value n and also divides the frequency of the original clock signal $\Phi$ into $\frac{1}{8}$ to output from the output terminal Qc the clock signal $\Phi1$ of 1.544 MHz corresponding to the data transmission rate of the ISDN line.

Meanwhile, the flip-flop 25, when receiving the separation clock signal CLKi from the NAND gate 12 (refer to FIG. 3), accepts the signal CLKi at the falling timing of the clock signal $\Phi$ (logically inverted through the inverter 24) and outputs from its Q terminal a Q signal to the latch circuit 22 as the latch timing signal LT. This results in that the latch circuit 22 latches the count value n of the counter 21 at the rising timing of the latch timing signal LT.

More in detail, as shown in FIG. 5, (a) is the separation clock signal CLKi, (b) is the original clock signal $\Phi$ of 12.352 MHz, (c) the count value n signal of the counter 21, (d) is the output (latched contents) of the latch circuit 22. When the separation clock signal CLKi rises at a time point between time points t1 and t2 as illustrated in FIG. 5(a), the flip-flop 25 outputs the latch timing signal LT at a falling edge (at a time point t3) of the original clock signal $\Phi$ appearing immediately after the rising point of the separation clock signal. Assume at this time the counter 21 has a count value n of "0". Then the latch circuit 22 latches the count value n of 0.

FIG. 2(e) shows the divided-frequency clock signal $\Phi1$ (whose frequency is $\frac{1}{8}$ of that of the original clock signal $\Phi$) issued from the output terminal Qc of the counter 21. The divided-frequency clock signal $\Phi1$ is applied from the counter 21 to the shift register 26.

The shift register 26 accepts the clock signal $\Phi1$ at the falling timing of the original clock signal $\Phi$ having a frequency corresponding to 8 times that of the clock signal $\Phi1$ and each time the original clock signal $\Phi$, shifts the stage by one state from an input stage QA to the last stage QH. As a result, the shift register outputs from its stage output terminals QA to QH the 8 sorts of delay clock signals $\Phi11$ to $\Phi18$ (see FIG. 2(f)) which corresponds to the clock signals $\Phi1$ but which phases are sequentially shifted by an amount corresponding to one period of the original clock signal $\Phi$. These delay clock signals $\Phi11$ to $\Phi18$ are supplied from the shift register 26 through the cross circuit 23 to the selector 29.

Meanwhile, since the value latched at the latch circuit 22 is "0", the decoder 23 supplies to the selector 29 the 8 sorts of output signals having a logical level of "1" appearing only at the output terminal dA among the output terminals dA to dH and having a logical level of "0" appearing at the other terminals dB to dH.

In the illustrated embodiment, the correlations within the selector 29 between the 8 sorts of delay clock signals Φ11 to Φ18 issued from the shift register 26 and the outputs dA to dH of the decoder 23 are previously adjusted by means of the cross circuit 31 as illustrated in FIG. 4, so that the selector 29 selectively outputs, among the delay clock signals Φ11 to Φ18 of the shift register 26, the signal Φ16 when the signal dA has a level "1", the signal Φ17 when the signal dB has a level "1", the signal Φ18 when the signal dF has a level of "1", the signal Φ11 when the signal dD has a level of "1", the signal Φ12 when the signal dE has a level of "1", the signal Φ13 when the signal dF has a level "1", the signal Φ14 when the signal dG has a level of "1", the signal Φ15 when the signal has a level of "1", respectively. And in the example shown in FIG. 5, the selector 29 selects the delay clock signal Φ16 issued from the output terminal QF of the shift register 26 and applies it to the flip-flop 30 at its input terminal D.

The flip-flop 30, when applied with the delay clock signal (delay clock signal Φ16) thereto, accepts the signal at every rising edge of the original clock signal Φ and outputs such a clock signal CLKs as shown in FIG. 5(g). That is, as seen from FIG. (g) and (a), the clock signal CLKs rises as delayed at a timing corresponding to a phase delay of about 25% of the separation clock signal CLKi with respect to nearly the mid-point of the logical high level duration (pulse width) of the signal CLKi. The clock signal CLKs is sent from the clock extractor of FIG. 4 to the clock generator 6 (see FIG. 1) as a clock signal for sampling of the received data signal, as already explained above.

The operation and function of the clock extractor of the present embodiment are summarized as follows.
(1) The 8 sorts of different delay clock signals Φ11 to Φ18 slightly shifted to each other in phase are generated at all times.
(2) Each time the flip-flop 25 detects the separation clock signal CLKi, the selector 29 selects one of the 8 sorts of delay clock signals Φ11 to Φ18 which allows most faithful reproduction of the continuity of the separation clock signal CLKi on the basis of the detection timing (phase).
(3) The selected clock signal is outputted as the clock signal CLKs for sampling of the received data signal.
(4) During a period in which the separation clock signal CLKi is not detected, the delay clock signal having the phase selected immediately before the absence of the detection of the signal CLKi is continuously outputted as the clock signal CLKs.
(5) The above selected delay clock signal and thus the above output clock signal CLKs is previously adjusted at the cross circuit 31 in such a manner as convenient to accept the data of the received signal, that is, so that the clock signal CLKs rises at the timing corresponding to nearly the mid-point of the pulse width of the separation clock signal CLKi.

In this way, the clock extractor of the present embodiment can easily output a clock signal that allows accurate reading-in operation of the data of the then received signal as the extraction clock signal CLKs through full non-adjusting operation.

In this connection, it is unnecessary for the clock signal CLKs to rise at the timing strictly accurately coinciding with the mid-point of the pulse width of the separation clock signal CLKi. In other words, so long as the clock signal CLKs rises anywhere within the duration of the separation clock signal CLKi having a logical level of "1", it is possible to accurately read in the corresponding data of the received signal. In this case, it goes without saying that the clock signal CLKs is preferably set to rise at the timing corresponding to nearly the mid-point of the pulse width of the separation clock signal CLKi as in the foregoing embodiment, because such setting provides a high allowance in reading the received signal data.

For our easy understanding of the present embodiment, consideration will next be directed to how jitter affects the circuit of the present embodiment. For example, when a jitter takes place in the data of a received signal, the separation clock signal CLKi having a relatively long pulse width at the beginning and then having a relatively short pulse width is detected. In the case of the separation clock signal CLKi having a relatively long pulse width, the rising position of the clock signal CLKs is shifted forward of the mid-point of the pulse width of the signal CLKi. When the rising position of the clock CLKs is shifted too forward, there is a possibility that the clock signal CLKs rises before generation of the separation clock signal CLKi having the next short pulse width.

In the case of the above example, the extraction clock signal CLKs rises at a time point t6. Thus, when the jitter causes the data width of the received data signal, i.e., the pulsed width of the separation clock signal CLKi to be short, it is possible to extract the data immediately before the time t6.

In the foregoing example, further, a portion of the pulse width of the separation clock signal CLKi (refer to FIG. 5(a)) between time points t3 to t6 corresponds to ⅜ of the pulse width and a portion of the pulse width between the time points t1 and t3 corresponds to a sampling error, so that the then allowable jitter range is below 37.5% (⅜ × 100) including the rising and falling times of the separation clock signal CLKi. In other words, so long as the allowable jitter range is below 37.5% including the rising and falling times of the separation clock signal CLKi, the jitter will not affect the operation of the embodiment circuit. Thus, when the extraction clock signal CLKs is set to rise at a time point t7 in the circuit of the embodiment, it is possible to obtain a jitter allowable range of below 50% (=4/8 × 100).

On the contrary, the jitter is usually prescribed to be below 20 and several % including the rising and falling times of the separation clock signal. Therefore, it will be appreciated that the circuit of the present embodiment can sufficiently withstand practically even the generation of such jitter. In addition, when it is required to adjust the rising time of the extraction clock signal CLKs, e.g. at the time point t7, this can be easily realized by changing the crossed connection of the cross circuit 31.

Even when the received signal data is subjected to a jitter, this influence can be sufficiently avoided through the circuit of the present embodiment; but when an abnormal waveform occurs in the received data signal due to noise, there is a danger that the occurrence of the abnormal waveform deteriorates the continuity of the clock signal CLKs is in the circuit of the present embodiment.

Figure 6:
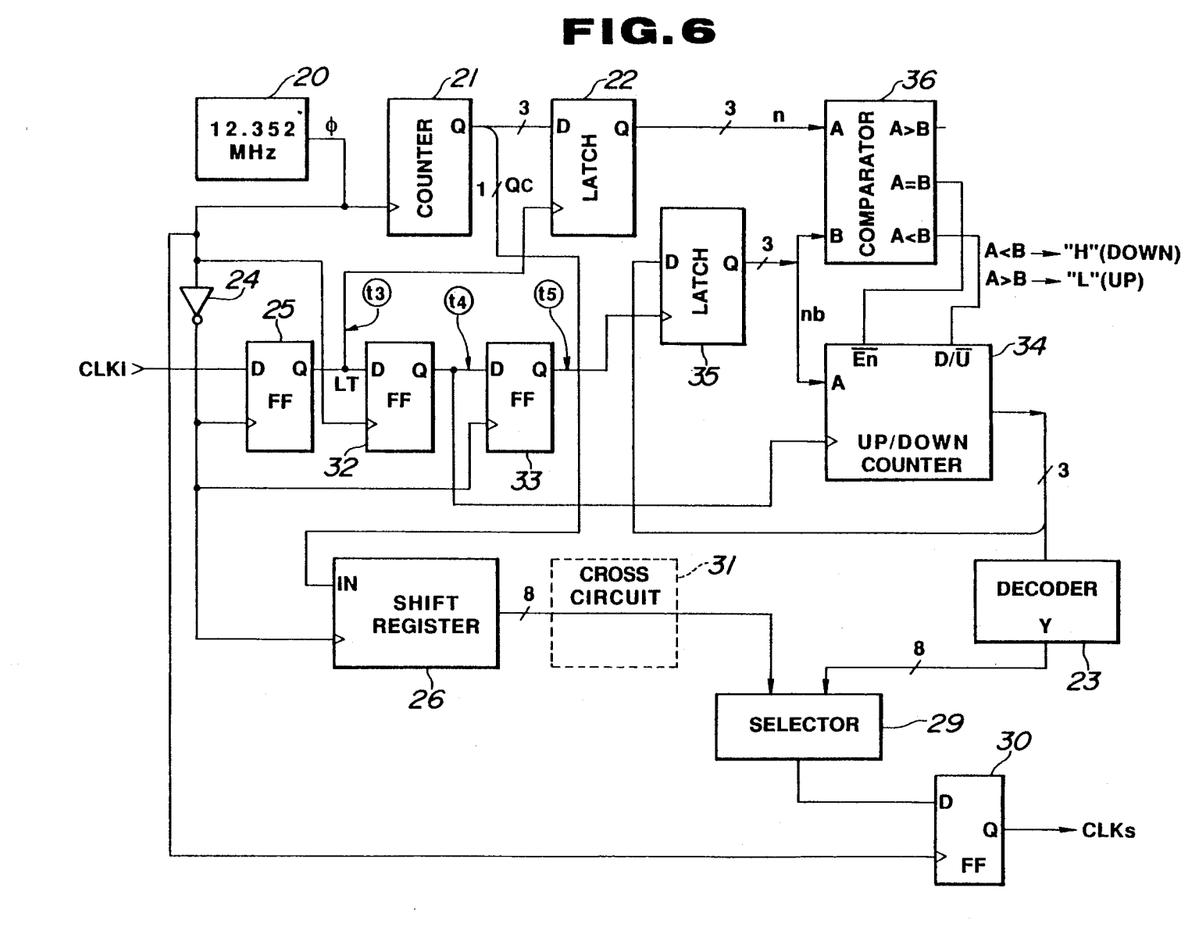
FIG. 6 is a block diagram showing the arrangement of a clock extracting circuit in accordance with another embodiment of the present invention.

Shown in FIG. 6 is a clock extracting circuit in accordance with another embodiment of the present invention, which, even when such an abnormal waveform occurs in the received data signal due to noise, can minimize the influence of the abnormal waveform.

In the circuit of FIG. 6, a D type flip-flop 32 accepts at the rising edge of the original clock signal Φ and sets therein the latch timing signal LT that is issued from the flip-flop 25 and that rises at the time point t3 in the example of FIG. 5; whereas, a D type flip-flop 33 accepts and sets therein an output of the flip-flop 32 at the falling edge of the original clock signal Φ. Accordingly, flip-flops 32 and 33 output signals which rise at the time points t4 and t5 in the example of FIG. 5, respectively.

The circuit of FIG. 6 further includes an up/down counter 34 for maintaining, counting up or counting down a value nb received at its input terminal A on the basis of the output of the flip-flop 32 rising at the time t4, a latch circuit 35 for latching an output value of the up/down counter 34 on the basis of the output of the flip-flop 33 rising at the time point t5, and a comparator 36 for receiving at its input terminal A the value n latched at the latch circuit 22 and also receiving at its input terminal B the value nb latched at the latch circuit 35 to compare these values. Through the loop operation of these elements, the noise processing operation of the clock extractor of the present embodiment is substantially carried out.

More specifically, the up/down counter 34 repetitively carries out the following operations (a) to (c) in accordance with a comparison output of the comparator 36, each time the flip-flop 32 rises.

(a) when the outputs A and B satisfy a relationship A=B, the up/down counter 34 maintains the value nb received at the input terminal A.

(b) When the outputs A and B satisfy a relationship A>B, the up/down counter counts up the value nb received at the input terminal A.

(c) When the outputs A and B satisfy a relationship A<B, the up/down counter counts down the value nb received at the input terminal A.

It is here to be noted that since the count value of the up/down counter 34 is latched at the latch circuit 35 at a timing after the counting, that is, at the time point t5 in FIG. 5, the value nb as the output of the latch circuit 35 indicates the previously counted value and is applied to the comparator 36 and the up/down counter 34. The operation of these elements 36 and 34 will be summarized as follows.

(1) The comparator 36 compares the previous count value nb with the current count value n, that is, monitors the periodicity of the input separation clock signal CLKi.

(2) When nb=n, the up/down counter 34 applies the count value (nb=n) to the decoder 23 as it is. The value applied to the decoder 23 is used in the next cycle as the previous count value nb.

(3) When nb>n, the up/down counter applies a value corresponding to the count value nb minus 1 to the decoder 23. The value applied to the decoder 23 is used in the next cycle as the previous count value nb.

(4) When nb<n, the up/down counter applies a value corresponding to the count value nb plus 1 to the decoder 23. The value applied to the decoder 23 is used in the next cycle as the previous count value nb.

Figure 7:
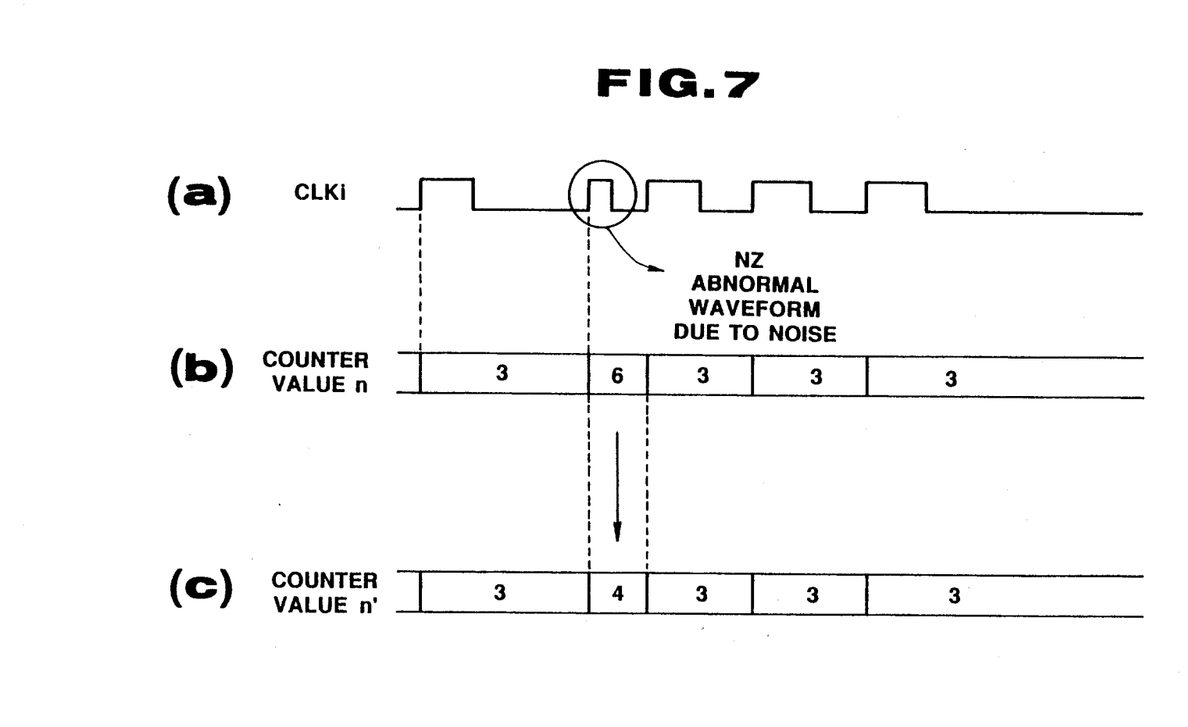
FIG. 7 is a timing chart for explaining the concept of noise eliminating or countermeasure processing operation of the clock extractor of FIG. 6.

For example, in the event where an abnormal waveform NZ takes place in the separation clock signal CLKi due to noise as shown in FIG. 7(a) and this causes the then count value n (corresponding to the count value n of the FIG. 5(c)) to become extremely different value (3→6) as shown in FIG. 7(b), through the above operation (the above operation (4)) a value n' actually applied in the current cycle to the decoder 23 and to be used in the next cycle as the previous count value nb is averaged down to a value (3→4) that is suppressed to its minimum extent in its change as shown in FIG. 7(c). Thereafter, when the count value returns to the normal level (when the count value n returns to 3 in the same example), the above operation (corresponding to the operation (3)) causes the value n' to be also returned to a normal value (4→3).

In this way, in the embodiment of FIG. 6, even when the waveform of the received data signal (separation clock signal) is made abnormal due to noise, the value to be applied to the decoder 23 as well as the value referenced as the previous count value nb are adjusted every time. Accordingly, the clock signal CLKs is not subjected to an extreme phase collapse and thus can be extracted in such a form that can maintain its ideal continuity to its maximum extent.

Figure 8:
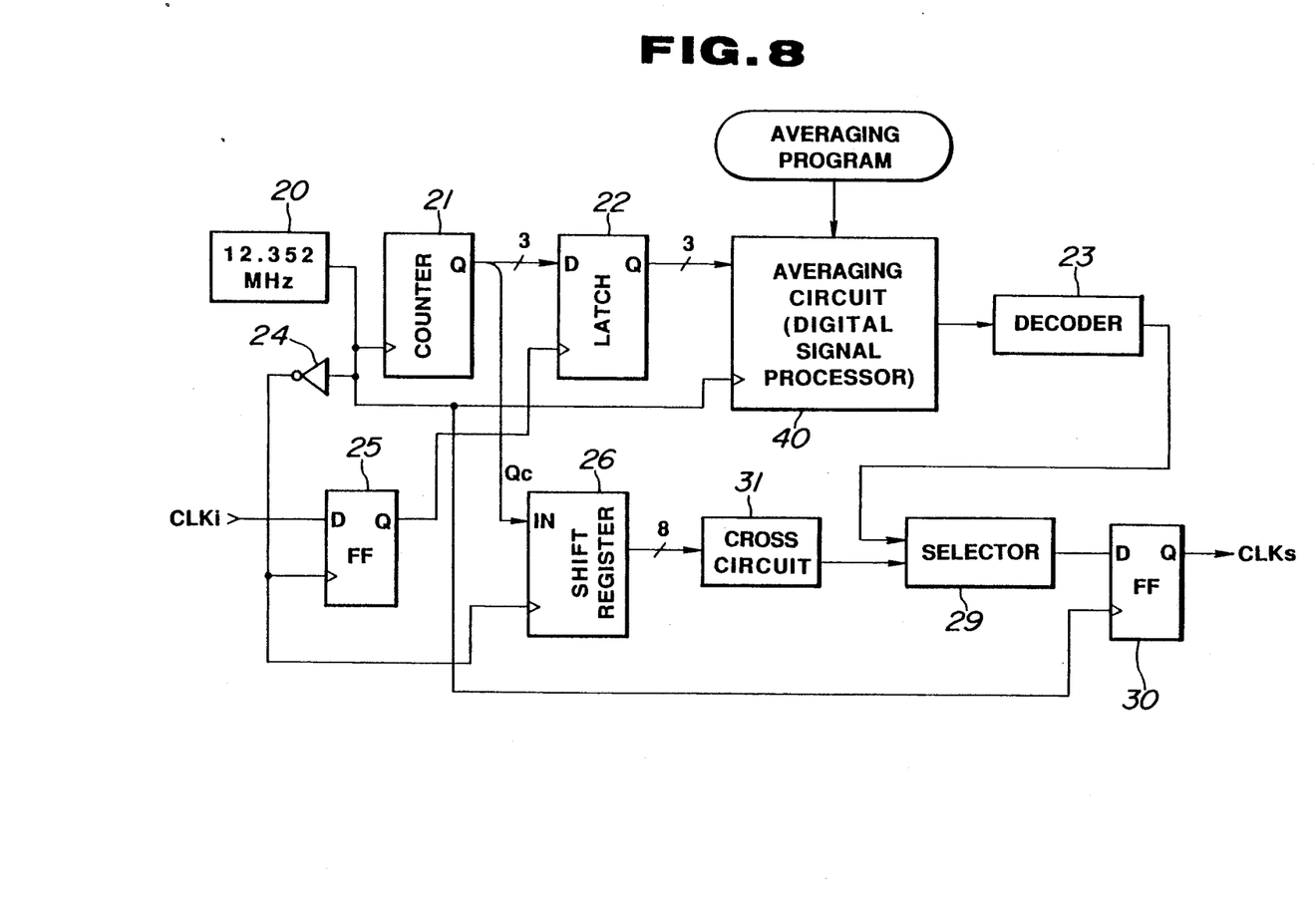
FIG. 8 is a block diagram showing an arrangement of a further embodiment of the clock extracting circuit in accordance with the present invention.

Although the embodiment of FIG. 6 has been arranged so that the clock synchronization (phase) is so-called "smoothed" through addition or subtraction of "1" when viewed with respect to a long period of time. However, such an arrangement as shown in FIG. 8 may be of course possible that an LSI such as a digital signal processor (DSP) 40 is used to "average" count values (outputs of the latch 22) for a previous constant period and the "averaged" count value is transferred to the decoder 23 when the count value latched at the latch 22 is different from the previous one. This also enables the smoothing of an abnormal waveform caused by noise or the like and thus the acquisition of the clock signal CLKs having a stable period (phase). The same elements in FIGS. 6 and 8 as those in FIG. 4 are denoted by the same reference numerals and explanation thereof is omitted.

Although the original clock signal Φ has been set to have a frequency of 12.352 MHz, the frequency division number has been set to be 21 in the counter 21 and the number of stages in the shift register 26 has been set to be 8 in the foregoing embodiments; the present invention is not limited to the particular values and these values may be arbitrarily selected according to the desired accuracy of phase of the extraction clock signal CLKs, as a matter of course.

What is claimed is:

1. A clock extractor in a digital line signal receiving circuit for generating a clock signal for sampling of a data signal received from a digital line on the basis of a separation clock having a period corresponding to a data communication rate of a data to be separated from the received data signal, said clock extractor comprising:

oscillation means for generating an original clock signal having a period corresponding to n times the period corresponding to said data communication rate, where n is an integer satisfying $n \geq 2$;

frequency division means for dividing said original clock signal generated at said oscillation means to generate a clock signal having a period corresponding to the data communication rate;

delay means for sequentially delaying the clock signal generated at said frequency division means on the basis of said original clock signal to generate a plurality of delay clock signals having phases mutually different by an amount corresponding to one period of said original clock signal;

detection means for detecting whether the separation clock has risen from a "low" level to a "high" level upon a falling edge of said original clock signal; and selection means for selecting one of said plurality of delay clock signals generated at said delay means in accordance with detection timing of said detection means and for outputting the selected delay clock signal as the clock signal for sampling of the data of the received data signal.

2. A clock extractor in a digital line signal receiving circuit as set forth in claim 1, wherein said frequency division means includes a counter circuit for dividing a frequency of a highest bit signal and for outputting a divided-frequency signal, a latch circuit for latching a count value of said counter circuit at a detection timing of said detection means, a decoder circuit for decoding said latched count value, and a selector circuit for specifying said delay clock signal on the basis of logical "AND" of the decoded signals and said delay clock signals.

3. A clock extractor in a digital line signal receiving circuit as set forth in claim 2, wherein said selection circuit includes a cross circuit which changes correlations between said decoded signals and said delay clock signals so that a rising of said selected and outputted clock signal is nearly at a mid-point of a pulse width of said separation clock.

4. A clock extractor in a digital line signal receiving circuit as set forth in claim 2, further comprising average means for monitoring the count value to be latched at said latch circuit every time, and when the current latched count value is different from a previous latched count value, for modifying the previous latched count value by 1 in a direction in which the difference becomes small, transferring the modified count value to said decoder circuit and also maintaining the modified count value as the previous latched count value.

5. A clock extractor in a digital line signal receiving circuit as set forth in claim 2, further comprising averaging means for always monitoring a count value latched at said latch circuit and when the current latched count value is different from the previous latched count value, for averaging the previous latched count values for a constant period of time and for transferring the averaged count value to said decoder circuit.

6. A clock extractor in a digital line signal receiving circuit as set forth in claim 1, wherein said clock extracting circuit is provided for each of truck circuits within a private branch exchange.

7. A clock extractor in a digital line signal receiving circuit as set forth in claim 1, wherein said digital line is a high-rate line.

8. A clock extractor in a digital line signal receiving circuit as set forth in claim 7, wherein said said data communication rate is on the order of 1.5 MHz corresponding to an ISDN line data transmission rate.

9. A clock extractor in a digital line signal receiving circuit for generating a clock signal for sampling of a data signal received from a digital line on the basis of a separation clock having a period corresponding to a data communication rate of a data to be separated from the received data signal, said clock extractor comprising:

means for generating a plurality of clock signals which have substantially identical periods corresponding to the data communication rate of the received data signal, and which have mutually shifted phases with respect to one another; and means for monitoring periodicity of said separation clock, for selecting one of said plurality of generated clock signals having a phase closest to a phase of the separation clock during which said periodicity is maintained, for averaging the phases of said separation clock to select one of said plurality of generated clock signals having a phase closest to the averaged phase of said separation clock during which the periodicity collapses to thereby generate a clock signal for sampling of the data of the received signal.

10. A clock extractor in a digital line signal receiving circuit for generating a clock signal for sampling of a data signal received from a digital line on the basis of a separation clock having a period corresponding to a data communication rate of a data to be separated from the received data signal, said clock extractor comprising:

means for always generating a plurality of clock signals which have respectively an identical period corresponding to the data communication rate of the received data signal and which phases are slightly shifted mutually; and means for monitoring periodicity of said separation clock, for selecting one of said plurality of generated clock signals which phase is most close to a phase of the separation clock in a zone of the separation clock during which said periodicity is maintained, for selecting another one of the plurality of generated clock signals which phase is shifted by one incremental unit in a direction in which the periodicity is compensated from a phase of a previous selected clock signal in a zone of the separation clock during which the periodicity collapses to thereby generate a clock signal for sampling of the data of the received data signal.

* * * * *